US012450947B2

(12) United States Patent
Filipowicz et al.

(10) Patent No.: US 12,450,947 B2
(45) Date of Patent: Oct. 21, 2025

(54) DEVICE, METHOD AND SYSTEM FOR PROVIDING A NOTIFICATION OF A DISTINGUISHING ACTIVITY (71) Applicant: MOTOROLA SOLUTIONS, INC., Chicago, IL (US)

(72) Inventors: Michal Filipowicz, Mogilno (PL); Pawel Jurzak, Cracow (PL); Marcin Witek, Cracow (PL); Jacek Doniec, Luborzyca (PL); Lukasz Kasprzyk, Nowa Wie Szlachecka (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 352 days.

(21) Appl. No.: 18/020,485

(22) PCT Filed: Sep. 28, 2020

(86) PCT No.: PCT/PL2020/050070
§ 371 (c)(1),
(2) Date: Feb. 9, 2023

(87) PCT Pub. No.: WO2022/066026
PCT Pub. Date: Mar. 31, 2022

(65) Prior Publication Data
US 2023/0290184 A1 Sep. 14, 2023

(51) Int. Cl.
*G06V 20/52* (2022.01)
*G06V 40/20* (2022.01)
*G08B 3/10* (2006.01)

(52) U.S. Cl.
CPC .............. *G06V 40/20* (2022.01); *G06V 20/52* (2022.01); *G08B 3/10* (2013.01)

(58) Field of Classification Search
None
See application file for complete search history.

(56) References Cited

U.S. PATENT DOCUMENTS 7,496,553 B2   2/2009  Cerrato
8,295,597 B1 * 10/2012  Sharma ................. G06V 20/41
                                                  382/173
(Continued)

FOREIGN PATENT DOCUMENTS

EP   2270761 A1       1/2011
JP   H09114988   *   5/1997   ............... G06T 1/00
(Continued)

OTHER PUBLICATIONS

P. Curtis, M. Harb, R. Abielmona and E. Petriu, "Behavior-driven video analytics system for critical infrastructure protection," the 2014 Seventh IEEE Symposium on Computational Intelligence for Security and Defense Applications (CISDA), Cau Giay, Vietnam, 2014, pp. 1-8 (Year: 2014).*

(Continued)

*Primary Examiner* — Beniyam Menberu
(74) *Attorney, Agent, or Firm* — PERRY + CURRIER INC (57) ABSTRACT A device, method and system for providing a notification of a distinguishing activity is provided. A devices receives information describing an appearance of a target object. The device determines, using the information, that the target object is located in images acquired by a camera. The device determines a distinguishing activity of the target object in the images. The device controls a notification device to provide a notification of the distinguishing activity.

18 Claims, 6 Drawing Sheets

(56) References Cited

U.S. PATENT DOCUMENTS

| | | | |
|---|---|---|---|
| 8,786,702 | B2 | 7/2014 | Cobb et al. |
| 2003/0058111 | A1* | 3/2003 | Lee ................ G08B 13/19641 348/E7.086 |
| 2016/0127457 | A1* | 5/2016 | Shaw ................ H04W 4/70 709/204 |
| 2016/0203641 | A1* | 7/2016 | Bostick ................ G06T 19/006 345/633 |
| 2018/0050800 | A1 | 2/2018 | Boykin et al. |
| 2018/0115749 | A1* | 4/2018 | Toshiyuki ........ G08B 13/19613 |
| 2018/0330610 | A1* | 11/2018 | Wu ........................ G08G 1/164 |
| 2019/0236377 | A1* | 8/2019 | Otake .................... G06V 20/52 |
| 2019/0266414 | A1 | 8/2019 | Stawiszynski et al. |
| 2019/0286901 | A1 | 9/2019 | Blanco et al. |
| 2020/0104603 | A1* | 4/2020 | Zucker ................ G06V 40/107 |
| 2020/0279390 | A1 | 9/2020 | Koskan et al. |

FOREIGN PATENT DOCUMENTS

| | | | | |
|---|---|---|---|---|
| JP | 2010205191 | * | 9/2010 | ............. B61L 23/00 |
| JP | 2012032910 | * | 2/2012 | ............. G08B 25/00 |
| WO | 2002087443 | A1 | 11/2002 | |
| WO | 2020204735 | A1 | 10/2020 | |

OTHER PUBLICATIONS

Breidenich, Markus, Examiner, International Search Report mailed Apr. 30, 2021, issued in the corresponding PCT Application No. PCT/PL2020/050070, Filed Sep. 28, 2020.

"Human Identification Based on Gait" https://books.google.pl/books?id=tD42mXCGRGcC; May 26, 2010.

Niu, Wei., et al., "Human Activity Detection and Recognition for Video Surveillance", pp. 719-2722, 004 IEEE International Conference on Multimedia and Expo (ICME), https://ieeexplore.ieee.org/document/1394293.

Sharma, Chandra Mani, et al., "Oh Human Activity Recognition in Video Sequences", International Conference on Computer & Communication Technology (ICCCT)-2011, downloaded on Jan. 31, 2023, https://ieeexplore.ieee.org/document/6075172.

Win, Sandar, et al., "Real-Time Human Motion Detection, Tracking and Activity Recognition with Skeletal Model", downloaded on Jan. 31, 2023, https://ieeexplore.ieee.org/document/9022822.

Albukhary, N., et al., "Real-Time Human Activity Recognition", 6th International Conference on Mechatronics—ICOM'17, IOP Conf. Series: Materials Science and Engineering 260 (2017) 012017.

Lu, Di, et al., "Entity-aware Image Caption Generation", In proceedings of EMNLP 2018, arXiv:1804.07889; https://blender.cs.illinois.edu/paper/imagecaption.pdf.

Bulling, Andreas, et al., "A Tutorial on Human Activity Recognition Using Body-Worn Inertial Sensors", (2013). ACM Computing Surveys. 46. 10.1145/2499621; https://perceptualui.org/publications/bulling14_csur.pdf.

Two Stream RNN CNN for action recognition in 3D videos YouTube; https://www.youtube.com/watch?v=GOPXKCEglo (Nov. 17, 2016).

Rui Hou T-CNN for Action Detection in Videos ICCV 2017 YouTube; https://www.youtube.com/watch?v=CNa18Y95kJU (Aug. 28, 2017).

Real-time event detection for video surveillance applications—YouTube; https://www.youtube.com/watch?v=QcCjmWwEUgg (Jun. 21, 2016).

Samsung Gallery—Apps on Google Play—https://web.archive.org/web/20200815135309/https://play.google.com/store/apps/details?id=com.sec.android.gallery3d (Aug. 15, 2020).

Amazon Rekognition—Video and Image—AWS—https://web.archive.org/web/20200926032030/https://aws.amazon.com/rekognition/ (Sep. 26, 2020).

* cited by examiner

DEVICE, METHOD AND SYSTEM FOR PROVIDING A NOTIFICATION OF A DISTINGUISHING ACTIVITY

BACKGROUND OF THE INVENTION

Public safety personnel, such as police officers, security guards, and the like, are often tasked with finding persons and/or suspects, and the like. Such public safety personnel may be provided with a photo of a person (e.g., a paper copy and/or an electronic copy viewable at a display screen of a mobile device). However, in order to search for the person, such public safety personnel may need to view the photo, then a crowd of people, then again refer to the photo, then back to the crowd, etc., in order to identify the person in the crowd. Such activity may cause such public safety personnel to miss seeing the person, and/or cause such public safety personnel to deviate from an eyes-up, hands free mode.

BRIEF DESCRIPTION OF THE SEVERAL VIEWS OF THE DRAWINGS

The accompanying figures, where like reference numerals refer to identical or functionally similar components throughout the separate views, together with the detailed description below, are incorporated in and form part of the specification, and serve to further illustrate embodiments of concepts that include the claimed invention, and explain various principles and advantages of those embodiments.

Skilled artisans will appreciate that components in the figures are illustrated for simplicity and clarity and have not necessarily been drawn to scale. For example, the dimensions of some of the components in the figures may be exaggerated relative to other components to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Public safety personnel, such as police officers, security guards, and the like, are often tasked with finding persons and/or suspects, and the like. Such public safety personnel may be provided with a photo of a person (e.g., a paper copy and/or an electronic copy viewable at a display screen of a mobile device). However, in order to search for the person, such public safety personnel may need to view the photo, then a crowd of people, then again refer to the photo, then back to the crowd, etc., in order to identify the person in the crowd. Such activity may cause such public safety personnel to miss seeing the person, and/or cause such public safety personnel to deviate from an eyes-up, hands free mode.

Hence, according to the present specification, a device method and system for providing a notification of a distinguishing activity is provided. For example, a computing device receives information describing an appearance of a target object, such as a suspect, a missing person, and the like. The computing device may comprise a server and/or cloud device, and the like, in communication with a device and/or devices, that include a camera, worn by public safety personnel and/or operated by the public safety personnel. The computing device may alternatively comprise a mobile device worn by a public safety personnel and/or operated by the public safety personnel (e.g., such as a vehicle mobile device), that includes a camera, such as a body worn camera, and/or the computing device may be a mobile device of a personal area network (PAN) of the public safety personnel that includes a camera. The information describing the appearance of the target object may comprise machine learning classifiers and/or the like, and/or any other suitable information that may be used in image and/or video analytics to identify the target object in images acquired by the camera. As such, the computing device receives images acquired by the camera and determines that the target object is located in the images, for example using any suitable image and/or video analytics. The computing device determines a distinguishing activity of the target object for example using any suitable image and/or video analytics; such distinguishing activities may include an action and/or an activity being performed by the target object that is not being performed by other objects and/or persons in the images. For example, the target object may be smoking, or holding a handrail and/or pole on a subway car, and the like, while other people in the images may not be smoking or holding a handrail and/or pole. The computing device controls a notification device, for example worn by the public-safety personnel and/or operated by the public safety personnel, to provide a notification of the distinguishing activity. In general, such a notification device may provide the notification in a heads-up, hands-free manner; hence, the notification device may comprise an audio device, a heads-up display, and the like. As such, the public-safety personnel is notified to look for the target object performing an activity, rather than merely look for an appearance thereof, which may assist the public-safety personnel with finding the target object. In particular, activities performed by a target object may be easier for a public-safety personnel to distinguish as compared to merely an appearance of the target object.

An aspect of the present specification provides a method comprising: receiving, at a computing device, information describing an appearance of a target object; determining, at the computing device, using the information, that the target object is located in images acquired by a camera; determining, at the computing device, a distinguishing activity of the target object in the images; and controlling, by the computing device, a notification device to provide a notification of the distinguishing activity Another aspect of the present specification provides a device comprising: a controller in communication with a camera and a notification device, the controller configured to: receive information describing an appearance of a target object; determine, using the information, that the target object is located in images acquired by the camera; determine a distinguishing activity of the target object in the images; and control the notification device to provide a notification of the distinguishing activity.

Figure 1:
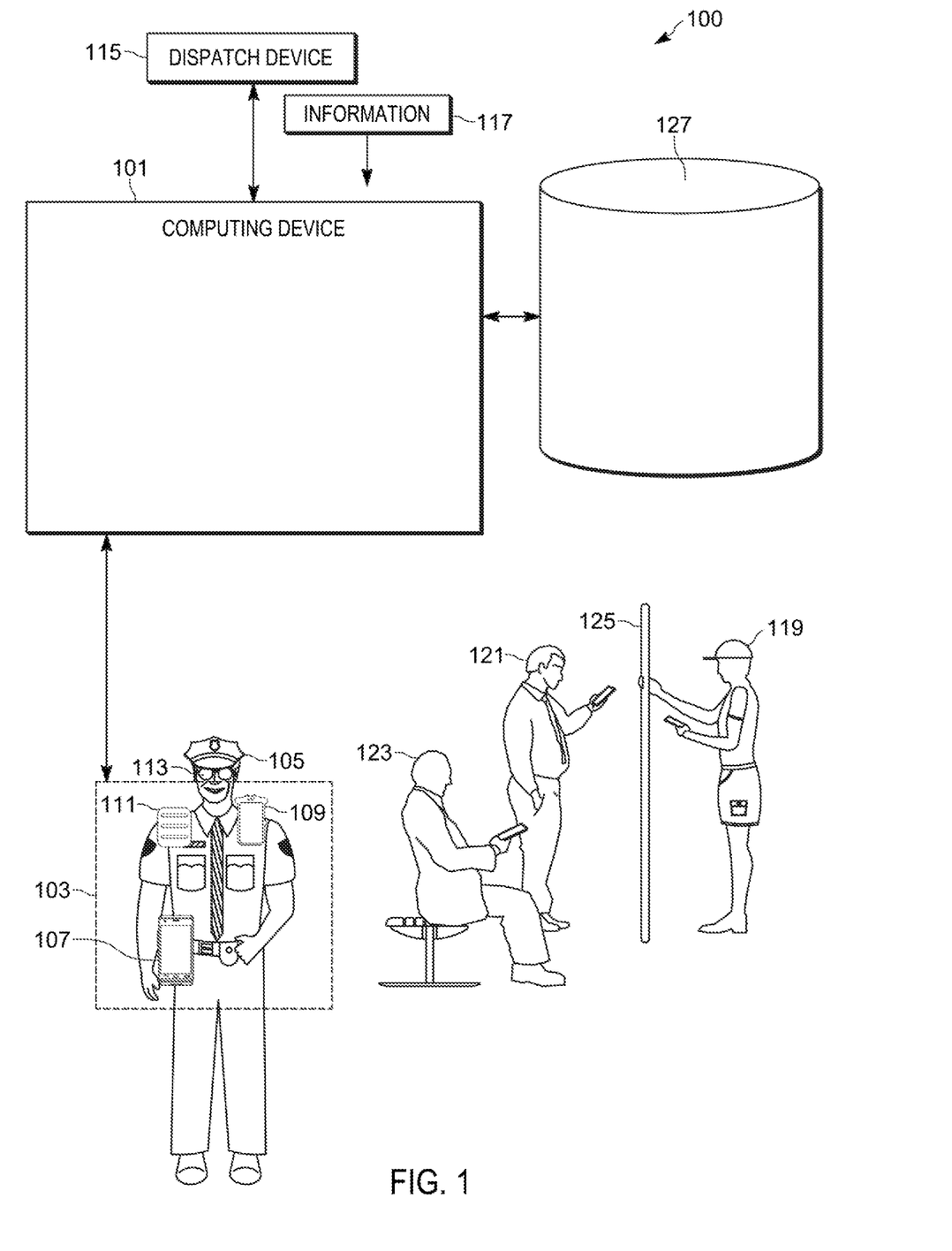
FIG. 1 is a system for providing a notification of a distinguishing activity, in accordance with some examples.

Attention is directed to FIG. 1, which depicts an example system 100 for providing a notification of a distinguishing activity. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks.

The system 100 comprises a computing device 101, which is in communication with devices of a personal area network (PAN) 103 of a user 105. As depicted, the PAN 103 includes, but is not limited to, a mobile device 107, a body-worn camera (BWC) 109, a remote-speaker microphone (RSM) 111, and a heads-up display (HUD) 113 in the form of smart-glasses worn by the user 105. While not depicted, the user 105 may be wearing an in-ear speaker that may play audio from one or more of the mobile device 107, the BWC 109, the RSM 111, and the HUD 113. While the devices of the PAN 103 are depicted as being worn by the user 105, one or more of the devices of the PAN 103 may not be worn by the user 105, but may be operated by the user 105; such devices may include, but is not limited to, vehicle devices (e.g., vehicle radios) and/or vehicle cameras and/or vehicle notification devices, laptop computing devices, and the like. Put another way, the devices of the PAN 103 may be operated by the user 105 and/or worn by the user 105, and the like.

The devices of the PAN 103 are understood to be in communication with each other via any suitable wired or wireless communication links therebetween (not depicted in the PAN 103 but nonetheless understood to be present). One or more of the devices of the PAN 103, such as the mobile device 107, may act as a hub device of the PAN 103, which communicates with external devices, such as the computing device 101, on behalf of other devices of the PAN 103. Hence, for example, the BWC 109 may transmit acquired images to the computing device 101 via the mobile device 107 and/or the computing device 101 may transmit data and/or commands to devices of the PAN 103 via the mobile device 107. However, any suitable device of the PAN 103 may act as a hub device.

As depicted, the PAN 103 includes at least one device that includes a camera, such as the BWC 109 and/or the mobile device 107 and/or the HUD 113. Such a camera acquires images, including, but not limited to, electronic and/or digital images and/or video frames and/or video, and the like, and such images are provided to the computing device 101.

Furthermore, the PAN 103 includes at least a device that may act as a notification device, and in particular a heads-up, hands-free notification device, which provides audio and/or visual notifications in a manner that allows the user 105 to hear or see such notifications without having to move their head down and/or without using their hands. For example, a heads-up, hands-free notification device may include a speaker of one or more of the mobile device 107, the BWC 109, the RSM 111 and/or the HUD 113, and/or an in-ear speaker.

Alternatively, a heads-up, hands-free notification device may include the HUD 113, which may include a display screen at which (and/or through) the user 105 may view objects in the "real world" as well as an alternative reality view in which visual notifications may be provided.

In general, the PAN 103 may include any suitable number of devices, which include a camera and a notification device (e.g., a heads-up, hands-free notification device). However, in other examples, the user 105 may wear and/or operate as few as one device that includes a camera and a notification device (e.g., a heads-up, hands-free notification device) and hence may not form a PAN.

Put another way, the user 105 generally may wear and/or operate one or more devices that include a camera and a notification device (e.g., a heads-up, hands-free notification device) and when the camera and the notification device are components of different devices, such devices may be in communication with each other and/or the computing device 101, via a PAN and/or without a PAN.

Furthermore, while the computing device 101 is depicted as a server and/or cloud device in communication with the PAN 103 via a communication link, in other examples, functionality of the computing device 101 may be incorporated into one or more devices of the PAN 103 and/or one or more devices worn by the user 105 and/or operated by the user 105. Put another way, the PAN 103 and/or one or more devices worn and/or operated by the user 105 may comprise the computing device 101.

As depicted, the computing device 101 is in further communication with a dispatch device 115, and the like. The dispatch device 115 may comprise a device operated by an entity, such as a police force, a security company, and the like, tasked with searching for target objects such as missing persons, persons-of-interest, suspects, and the like, however such target objects may include non-human objects such as vehicles (e.g., stolen vehicles), self-driving vehicles, bicycles, drones, and the like. In yet further examples, such target objects may include animals, such as dogs, cats, and/or other animals (e.g., lost pets, and the like).

For example, as depicted, the dispatch device 101 is transmitting, to the computing device 101, information 117 describing an appearance of a target object. The information 117 may comprise an electronic BOLO (be-on-the-lookout), and the like, for searching for a target object 119 and generally includes information describing an appearance of a target object. For example, such an appearance may include a static and/or visual appearance of a target object, as next described.

In particular, the information 117 may include, but is not limited to, one or more of: a textual description of an appearance of a target object; a photo of the target object; a machine learning classifier and/or classifiers representing an appearance of a target object, generated by the dispatch device 115, and/or another suitable device (e.g., from a textual description of an appearance of a target object and/or a photo of the target object); biometric data describing an appearance of a target object (e.g., feature vectors, facial landmarks, and the like), and the like. In general, the information 117 is of a type and/or format, which enables any suitable image and/or video analytics to identify the target object in images (e.g., including, but not limited to, images and/or video frames of video) based on an appearance of the target object. When a target object comprises a person, such information 117 may include, but is not limited to, data (in any suitable format, as described above) representing any suitable combination of age, gender, race, height, build, last known items of clothing worn of the person, and the like. When a target object comprises a non-human object, such information 117 may include, but is not limited to, data (in any suitable format, as described above) representing any suitable combination of type of the non-human object (e.g., car, bicycle, drone and the like), color, make, model, and the like of the target object, and the like. When a target object comprises an animal, such information 117 may include, but is not limited to, data (in any suitable format, as described above) representing a type of the animal, color(s), a collar worn by the animal, and the like.

In the depicted example, a target object 119 may comprise a person, and the user 105 may comprise a police officer who may be tasked with finding the target object 119. However the user 105 may comprise any suitable user who may be tasked with finding the target object 119 including, but not limited to, a security guard (e.g., at a mall), an emergency medical technician (EMT) and/or a firefighter (e.g., searching for a particular user in a building and/or burning building who may have a medical condition and may need to be first evacuated), and/or a volunteer and/or a member of the public.

In the depicted example, the target object 119 may be riding a subway car, and the like, and the user 105 may be searching for the target object 119 on the subway car, and the like. However, as the target object 119 may be one object, amongst a plurality of other objects 121, 123, for example persons on a crowded subway car, the user 105 may find it challenging to identify the target object 119, for example from a photo thereof, without looking at the photo repeatedly and scanning the crowd, which takes the attention of the user 105 away from the crowd.

As such, as will be explained in more detail below, the computing device 101 may receive images acquired by a camera, such as the BWC 109, and determine, using the information 117, that the target object 119 is located in the images. As such, it is understood herein that camera of the PAN 103, such as the BWC 109, and the like, is acquiring images of the crowd on the subway and/or that the crowd is in a field-of-view of a camera of the PAN 103, and the like.

While the computing device could control a notification device of the PAN 103 to provide a description of the appearance of the target object 119, such a description may not be enough for the user 105 to quickly identify the target object in a crowd of objects.

Hence, as will be also explained in more detail below, the computing device 101 may determine a distinguishing activity of the target object in the images. For example, as depicted, all three objects 119, 121, 123 may be looking at mobile/cell phones, and both the objects 119, 121 are standing. However, only the target object 119 is holding a pole 125 (e.g., a handrail on the subway car). Hence, in the depicted example, a distinguishing activity of the target object 119 may be "holding a pole" and the computing device 101 may determine such a distinguishing activity using the images from the BWC 109, and the like.

In some examples, the distinguishing activity may be determined from a list of distinguishing activities (e.g., provided in the form of machine learning classifiers and/or other suitable information describing various possible distinguishing activities), for example provide to the computing device 101 by the dispatch device 115, and the like, and/or provisioned at the computing device 101. Alternatively and/or in addition to such a list, the computing device 101 may include any suitable algorithm, and/or image and/or video analytics, and/or machine learning algorithm, and the like, configured to determine distinguishing activities. Various examples of such algorithms are described in more detail below.

When the computing device 101 determines a distinguishing activity, the computing device 101 controls a notification device worn by the user 105 to provide a notification of the distinguishing activity. For example, the computing device 101 may transmit a command to one or more of the mobile device 107, the BWC 109, the RSM 111 and/or the HUD 113 to play a respective audio notification at a respective audio device, such as "The target object is holding a pole", and the like. Alternatively, the computing device 101 may transmit a command to the HUD 113 to highlight and/or identify the target object 119 at a display screen thereof, and/or to provide a textual message, and the like, such as "The target object is holding a pole", and the like.

Furthermore, while analysis of the images from the BWC 109, and the like, may occur in real-time (e.g., as the images are received at the computing device 101), in other examples, the computing device 101 may store the images in association with time-stamps, for example at one or more memories, such as a memory 127, accessible to the computing device 101. While as depicted, the memory 127 is depicted as a database external to the computing device 101, in other examples the memory 127 may comprise a component of the computing device 101 and/or a device of the PAN 103, and/or a component of any suitable device worn by the user 105 and/or operated by the user 105.

Hence, the computing device 101 may analyze images stored at the memory 127, and the like, for example in response to receiving the information 117. In these examples, the computing device 101 may, after determining a distinguishing activity of the target object 119, control a notification device of the PAN 103, and the like, to provide a notification of the distinguishing activity along with a time of an image and/or images in which the target object 119 and the distinguishing activity was detected. Hence, the user 105 may be notified that the target object was in a field-of-view of a camera of the PAN 103 at a given time.

Figure 2:
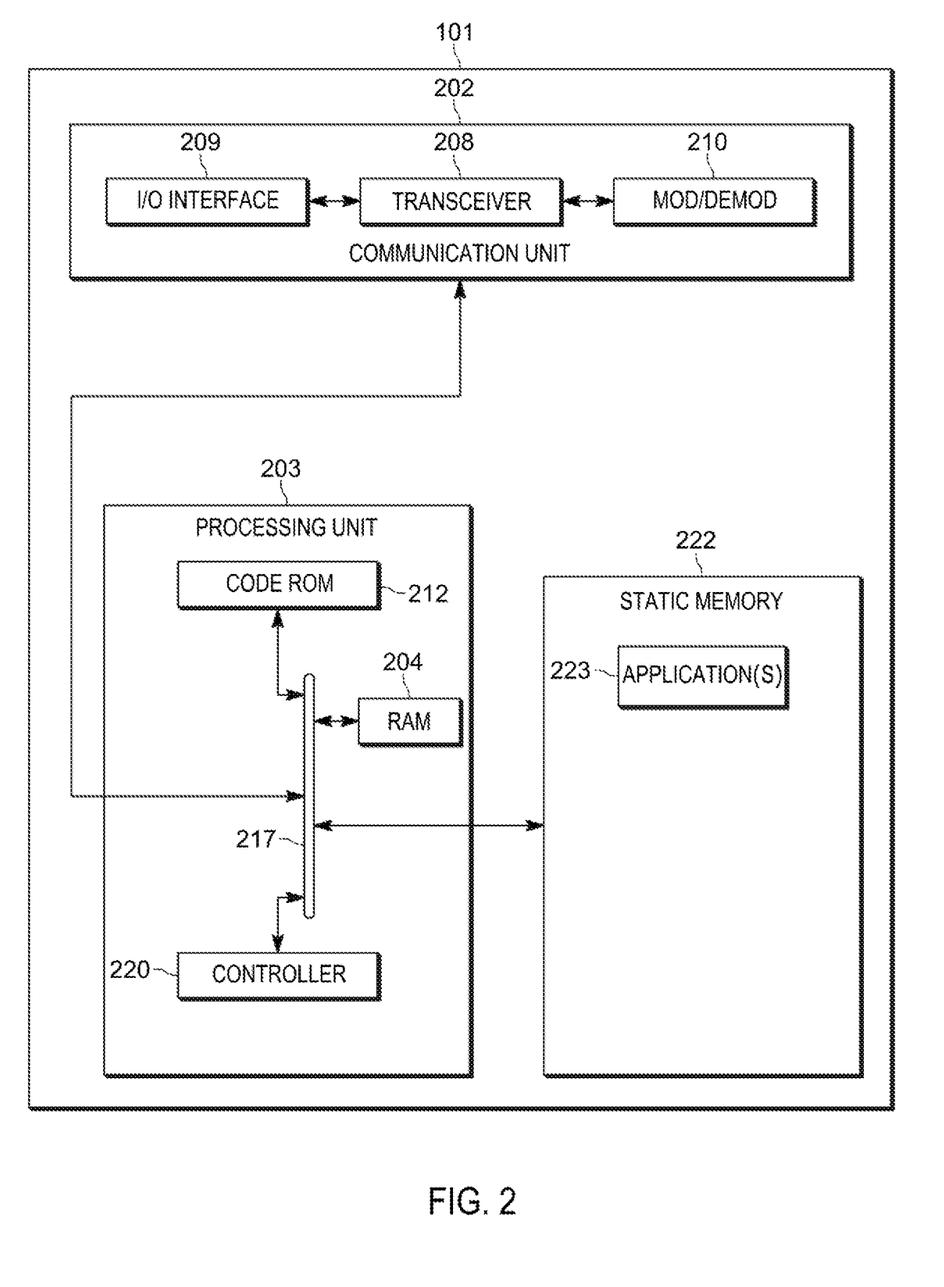
FIG. 2 is a device diagram showing a structure of a device for providing a notification of a distinguishing activity, in accordance with some examples.

Attention is next directed to FIG. 2, which depicts a schematic block diagram of an example of the computing device 101. In general, the computing device 101 may comprise one or more servers and/or one or more cloud computing devices in communication with the PAN 103 and/or a device operated by the user 105. However, the computing device 101 (and/or functionality thereof) may be combined with one or more devices of the PAN 103 and/or a device worn and/or operated by the user 105. The computing device 101 may further be in communication with the memory 127, which may be local or remote from the computing device 101, and in communication therewith via any suitable combination of wired and/or wireless communication links.

As depicted, the computing device 101 comprises: a communication unit 202, a processing unit 203, a Random-Access Memory (RAM) 204, one or more wireless transceivers 208 (which may be optional), one or more wired and/or wireless input/output (I/O) interfaces 209, a combined modulator/demodulator 210, a code Read Only Memory (ROM) 212, a common data and address bus 217, a controller 220, and a static memory 222 storing at least one application 223. Hereafter, the at least one application 223 will be interchangeably referred to as the application 223. Furthermore, while the memories 204, 212 are depicted as having a particular structure and/or configuration, (e.g., separate RAM 204 and ROM 212), memory of the computing device 101 may have any suitable structure and/or configuration.

While not depicted, the computing device 101 may include one or more of an input device and a display screen and the like. In yet further examples, the computing device 101 may include a clock, to determine times that images from a device of the PAN 103 are received at the computing device 101 (e.g., to time-stamp the images); such a clock may include, but is not limited to, a clock of the controller 220 and/or the processing unit 203, and the like.

As shown in FIG. 2, the computing device 101 includes the communication unit 202 communicatively coupled to the common data and address bus 217 of the processing unit 203.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory 204 and the static memory 222.

The communication unit 202 may include one or more wired and/or wireless input/output (I/O) interfaces 209 that are configurable to communicate with other components of the system 100. For example, the communication unit 202 may include one or more transceivers 208 and/or wireless transceivers for communicating with other suitable components of the system 100. Hence, the one or more transceivers 208 may be adapted for communication with one or more communication links and/or communication networks used to communicate with the other components of the system 100. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP ($3^{rd}$ Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication unit 202 may further include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 may also be coupled to a combined modulator/demodulator 210.

The controller 220 may include ports (e.g., hardware ports) for coupling to other suitable hardware components of the system 100.

The controller 220 may include one or more logic circuits, one or more processors, one or more microprocessors, and/or the controller 220 may include one or more ASIC (application-specific integrated circuits) and one or more FPGA (field-programmable gate arrays), and/or another electronic device. In some examples, the controller 220 and/or the computing device 101 is not a generic controller and/or a generic device, but a device specifically configured to implement functionality for providing a notification of a distinguishing activity. For example, in some examples, the computing device 101 and/or the controller 220 specifically comprises a computer executable engine configured to implement functionality for providing a notification of a distinguishing activity.

The static memory 222 comprises a non-transitory machine readable medium that stores machine readable instructions to implement one or more programs or applications. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functional teachings of the computing device 101 as described herein are maintained, persistently, at the memory 222 and used by the controller 220, which makes appropriate utilization of volatile storage during the execution of such programming instructions.

Figure 3:
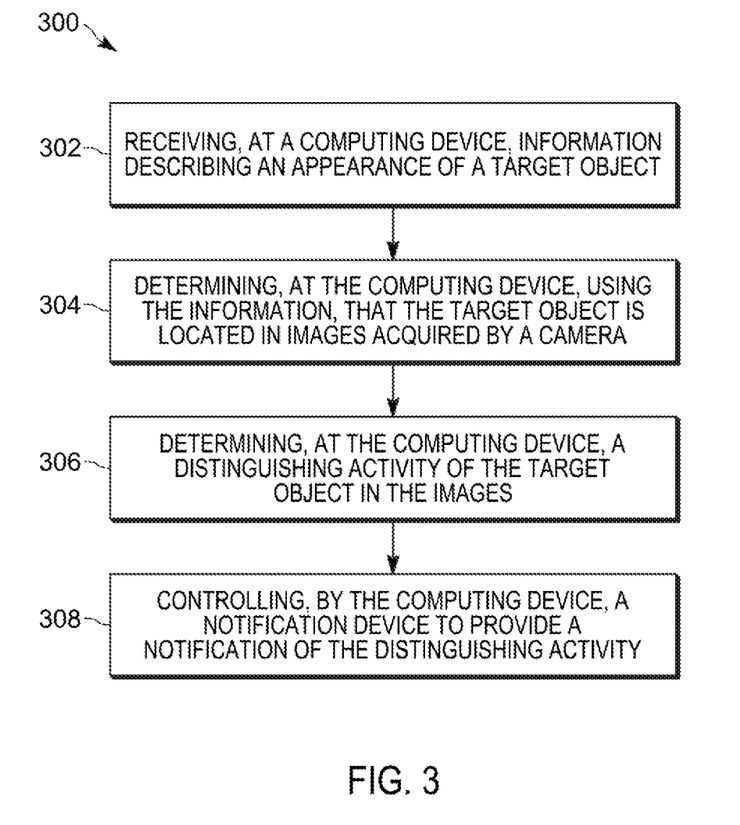
FIG. 3 is a flowchart of a method for providing a notification of a distinguishing activity, in accordance with some examples.

In particular, the memory 222 stores instructions corresponding to the at least one application 223 that, when executed by the controller 220, enables the controller 220 to implement functionality for providing a notification of a distinguishing activity, including but not limited to, the blocks of the methods set forth in FIG. 3.

In some examples, the application 223 further includes a text-to-speech module to convert text to audio data, as described in more detail below.

In illustrated examples, when the controller 220 executes the one or more applications 223, the controller 220 is enabled to: receive information describing an appearance of a target object; determine, using the information, that the target object is located in images acquired by a camera; determine a distinguishing activity of the target object in the images; and control a notification device to provide a notification of the distinguishing activity.

The application 223 may include programmatic algorithms, and the like, to implement functionality as described herein, which may include, but is not limited to, a programmatic image and/or video analysis engine.

Alternatively, and/or in addition to programmatic algorithms, the application 223 may include one or more machine learning algorithms to implement functionality as described herein, and which may include, but is not limited to, a machine learning image and/or video analysis engine. The one or more machine learning models and/or algorithms of the application 223 may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public-safety environments. Any suitable machine learning algorithm and/or deep learning algorithm and/or neural network is within the scope of present examples.

While the components of the devices of the PAN 103 and the dispatch device 115 are not depicted, it is understood that components of such devices may be similar to the components of the computing device 101, but adapted for respective functionality thereof as described herein. In particular, one or more of the devices of the PAN 103 may include a clock and/or a location determining device, such as a Global Positioning System (GPS) device, and the like, which may be used to determine a time and/or a location of images acquired by a camera of the PAN 103, and the like. Indeed, images acquired by cameras herein may further include a time (e.g., a timestamp) and/or a location, for example as metadata. Furthermore, one or more devices of the PAN 103 may include a text-to-speech module, as described in more detail below.

Attention is now directed to FIG. 3, which depicts a flowchart representative of a method 300 for providing a notification of a distinguishing activity. The operations of the method 300 of FIG. 3 correspond to machine readable instructions that are executed by the computing device 101, and specifically the controller 220 of the computing device 101. In the illustrated example, the instructions represented by the blocks of FIG. 3 are stored at the memory 222 for example, as the application 223. The method 300 of FIG. 3 is one way in which the controller 220 and/or the computing device 101 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 220 and/or the computing device 101 receives information describing an appearance of a target object.

For example, as described above, the block 302 may include the controller 220 and/or the computing device 101 receiving the information 117 from the dispatch device 115. However, the controller 220 and/or the computing device 101 may receive the information 117 from any suitable device and/or the controller 220.

Alternatively, the computing device 101 may receive the information 117 by retrieving the information 117 from a memory; for example, at the beginning of a shift of the user 105 (e.g., when the user 105 logs into the computing device 101, and the like), the computing device 101 may retrieve the information 117 describing the appearance of the target object 119 from a central memory and/or database (not depicted, but which may include the memory 127). For example, such a central memory and/or database may generally store information (e.g., including, but not limited to, the information 117) describing appearance of one or more target objects that the user 105 is to search for during a shift. Such information at such a central memory and/or database may be updated, as target objects that are to be searched are added, and/or such information may be removed as target objects are accounted for, and the like.

Put another way, while present examples are described with respect to searching for one target object 119, the controller 220 and/or the computing device 101 may receive a plurality of information (e.g., from the dispatch device 115, and the like, and/or retrieved from a central memory), similar to the information 117, but describing the appearance of a plurality of respective target objects; in these examples, the controller 220 and/or the computing device 101 may search for a plurality of target objects, similar to as described hereafter.

Hereafter the method 300 is described with respect to searching for the target object 119 using the information 117 based on images acquired by the BWC 109, though it is understood that images acquired by any suitable camera is within the scope of the present specification, as well as searching for any suitable target object.

At a block 304, the controller 220 and/or the computing device 101 determines, using the information 117, that the target object 119 is located in images acquired by a camera, such as the BWC 109.

For example, the BWC 109 may transmit acquired images to the computing device 101 such that the images may be processed to search for the target object 119 using the information 117, and/or the BWC 109 (and/or another device of the PAN 103) may implement at least a portion of the functionality of the computing device 101, such that the BWC 109 processes the images to search for the target object 119 using the information 117.

For example, as described above, the controller 220 and/or the computing device 101 may apply any suitable combination of image and/or video analytics to search the images acquired by the BWC 109 based on the information 117.

For example, with brief reference back to FIG. 1, it is apparent that the target object 119 is a Caucasian male of a given height and age, wearing a ball-cap and shorts. As such, the information 117 may comprise one or more machine learning classifiers which indicate that the target object 119 is a Caucasian male of a given height and age, wearing a ball-cap and shorts; such classifiers may be used by a machine learning algorithm of the application 223, being executed by the controller 220 and/or the computing device 101, to identify the target object 119 in the images acquired by the BWC 109. However, as described above, the information 117 may have any suitable format and a search for the target object 119 using the information 117 may occur using any suitable process.

Hereafter, it is understood that the controller 220 and/or the computing device 101 has determined that the target object 119 is in the images acquired by the BWC 109 based on the information 117.

At a block 306, the controller 220 and/or the computing device 101 determines a distinguishing activity of the target object 119 in the images (e.g., acquired by the BWC 109).

The controller 220 and/or the computing device 101 may use any suitable technique for determining a distinguishing activity (e.g., as provided via the application 223) of a target object in images including, but not limited to, human activity recognition applications, spatiotemporal localization applications, real-time event detection applications, computer vision applications, trajectory and/or motion tracking algorithms, templates, mask, skeletal modeling, and/or any combination of one or more suitable machine learning algorithms trained to determine activities of target objects.

For example, it is further understood that the controller 220 and/or the computing device 101 is configured to determine other objects, and activities thereof, in images. In particular, the controller 220 and/or the computing device 101 may be provided with information and/or machine learning classifiers (e.g., at the application 223), and the like, that enable the controller 220 and/or the computing device 101 to identify other objects in images that are of a similar type as the target object 119. Hence, for example, when the target object 119 is a person, the controller 220 and/or the computing device 101 determines other persons in the images, and activities thereof. Similarly, when the target object 119 is a non-human object, the controller 220 and/or the computing device 101 determines other similar objects in the images, and activities thereof.

Hence, for example, the controller 220 and/or the computing device 101 may determine the distinguishing activity of the target object 119 in the images by: determining one or more activities of the target object 119 in the images; determining one or more respective activities of one or more other objects 121, 123 in the images; and determining that the distinguishing activity (e.g., of the target object 119) comprises one or more of the activities of the target object 119 that distinguish from the one or more respective activities of the one or more other objects 121, 123.

Hence, for example, the controller 220 and/or the computing device 101 may determine that target object 119 is standing, using a cell phone, holding the pole 125 and facing left. However, as the object 121 is standing and using a cell phone, and as the object 123 is sitting and using a cell phone, neither "Standing" nor "Using A Cell Phone" is determined to be a distinguishing activity. However, as neither of the objects 121, 123 are holding a pole, and as neither of the objects are facing left, the controller 220 and/or the computing device 101 may determine one or more of "Holding A Pole" and "Facing Left" are distinguishing activities.

In some examples, the controller 220 and/or the computing device 101 may be configured with, and/or have access to (e.g., as stored at the memory 127, and the like) a list of distinguishing activities. Such a list may comprise a list of machine learning classifiers corresponding to different activities that may be performed by a target object. Furthermore, such a list may be specific to one or more of a type of target object and/or a location of a target object and/or the user 105.

For example, when a target object comprises a person, the activities represented by a list of distinguishing activities may comprise activities that a human may perform such as sitting, standing, walking, running, jumping, talking, singing, using a cell phone, a smoking, touching something, stroking something (e.g., such as a pet, and the like), and/or any other suitable activity. Such examples further illustrate that distinguishing activities may include audio-based activities that may be determined using audio of images (e.g., audio of video) received from the BWC 109, and the like.

However, when a target object comprises a vehicle, and the like, the activities represented by a list of distinguishing activities may comprise activities that a vehicle may perform such as acceleration, braking, making a U-turn, honking, and/or any other suitable activity.

However, when a target object comprises an animal, and the like, the activities represented by a list of distinguishing activities may comprise activities that an animal may perform such as wagging a tail, shaking a head, scratching, and the like.

Hence, the controller 220 and/or the computing device 101 may have access to a plurality of lists for different target object types, and select a list corresponding to a type of the target object 119 as represented by the information 117.

Furthermore, such a plurality of lists may include lists specific to different locations of a target object and/or the user 105. For example, the controller 220 and/or the computing device 101, may select a list on the basis of locations received as metadata of images. In a particular example, a list may be selected on the basis of a location being a subway car (and/or a subway line); such a list may comprise distinguishing activities that a human may perform on a subway car, such as sitting (e.g., forward or sideways), standing, facing left, facing right, using a cell phone, holding a pole (vertical or horizontal), walking to or from a subway door, and the like.

In another example, the controller 220 and/or the computing device 101, on the basis of location information received from a location determining device of the PAN 103, may determine that the user 105 is in a mall, and select a list of distinguishing activities that a human may perform in mall, such as sitting (e.g., forward or sideways), standing, using a cell phone, eating, entering or exiting a specific store, and the like.

Furthermore, the activities on lists, as described herein, may be provided in a respective given order. Such an order may be determined heuristically, for example according to most likely activities to least likely activities, and/or lists may be updated via an application (e.g., which may be executed by the controller 220 and/or the computing device 101 and which may include, but is not limited to, the application 223 adapted for such functionality), which causes a computing device, including, but not limited to, the computing device 101, to monitor activities in images to determine most likely activities to least likely activities. In these examples, such lists may be updated periodically, for example, as the computing device 101 determines which activities occur more often than other activities. Furthermore, the computing device 101 may add activities to such lists and/or remove activities from such lists, as new activities are detected (e.g., using machine learning algorithms, and like), and/or as activities on the lists are not detected for a given time period (e.g., such as within a year, and/or any other suitable time period).

Furthermore such lists may be generated by the controller 220 and/or the computing device 101 as images are monitored and/or provided by an administrator of the system 100.

Regardless, in examples that include a list of distinguishing activities being provided, the controller 220 and/or the computing device 101 may determine, at the block 306, a distinguishing activity of the target object 119 in the images by: determining that the target object 119 is performing a given activity in a list of activities; when one or more other objects 121, 123 in the images are not performing the given activity, determining that the distinguishing activity comprises the given activity; and when at least one of the one or more other objects 121, 123 are performing the given activity: determining that the target object 119 is performing a further activity of the list; and when the one or more other objects are not performing the further activity, determining that the distinguishing activity comprises the further activity.

Put another way, the controller 220 and/or the computing device 101 may process images from the BWC 109, and the like, and determine that the target object 119 is performing a given activity in a list of activities, such as a first activity of the list, for example "Standing". With brief reference to FIG. 1, it is apparent that the target object 119 is standing, and hence the controller 220 and/or the computing device 101 may determine that the target object 119 is performing the given activity. The controller 220 and/or the computing device 101 may process images from the BWC 109 to determine whether or not the other objects 121, 123 are performing the first activity. When the other objects 121, 123 are not performing the first activity, such as standing, the controller 220 and/or the computing device 101 may determine that the distinguishing activity is the given activity, such as standing. However, with further reference to FIG. 1, it is apparent that the object 121 is standing, while the object 123 is sitting. As such, the controller 220 and/or the computing device 101 may determine that the target object 119 is performing another and/or further activity and/or on the list, such as a next and/or second activity; for example a further activity may be "Holding A Pole". As the other objects 121, 123 are not performing the further activity, the controller 220 and/or the computing device 101 determines that the distinguishing activity is "Holding A Pole". While this example is described with respect to two activities, it is understood that the controller 220 and/or the computing device 101 may determine whether or not the target object 119 is performing any suitable number of activities that distinguish from the activities of the other objects 121, 123. For example, with reference to FIG. 1, "Using A Cell Phone" may not be a distinguishing activity, but "Facing Left" may be a distinguishing activity.

In some examples, when there is no single activity performed by the target object 119 that distinguishes from respective activities performed by one or more other objects 121, 123 in the images, a distinguishing activity determined by the controller 220 and/or the computing device 101 may comprise: a combination of two or more activities of the target object 119 that distinguish from respective combinations of the respective activities of the one or more other objects 121, 123 in the images. In a specific example, if one of the objects 121, 123 was holding the pole 125, but facing right, while the other of the objects 121, 123 was not holding a pole, but facing left, but neither of the objects 121, 123 were both holding a pole and facing left, then the controller 220 and/or the computing device 101 may determine that a distinguishing activity of the target object 119 is a combination of "Holding A Pole" and "Facing Left".

Hence, in some examples, the controller 220 and/or the computing device 101 may determine distinguishing activities of the target object 119 in comparison to all the objects 121, 123 at once, whereas in other examples the controller 220 and/or the computing device 101 may determine respective distinguishing activities of the target object 119 in respective comparison to the objects 121, 123 (e.g., to find a combination of two or more activities of the target object 119 that distinguish from respective combinations of the respective activities of the one or more other objects 121, 123).

At a block 308, the controller 220 and/or the computing device 101 controls a notification device to provide a notification of the distinguishing activity.

For example, the controller 220 and/or the computing device 101 may transmit a command to a device of the PAN 103, that includes an audio device, to provide an audio notification of the distinguishing activity. For example, the controller 220 and/or the computing device 101 may transmit a command to the mobile device 107 and/or the BWC 109 and/or the RSM 111 and/or the HUD 113 to control a respective speaker thereof to provide an audio notification that "The target object is holding a pole" and/or "The target object is holding a pole and facing left", and the like, and/or any other suitable audio notification of the distinguishing activity and/or combination of distinguishing activities.

In some of these examples, the controller 220 and/or the computing device 101 may transmit a command to the HUD 113 to provide a visual notification of the distinguishing activity, for example a visual notification that includes text such as "The target object is holding a pole" and/or "The target object is holding a pole and facing left", and the like. However, such a visual notification may also be graphical; for example, the visual notification may include a portion of an image acquired by the BWC 109 that shows the target object 119 performing the distinguishing activity, and the like; in such examples, the portion of an image acquired by the BWC 109 that shows the target object 119 performing the distinguishing activity may highlight a distinguishing activity, such as an arm and/or a hand of the target object 119 holding the pole 125.

However, the controller 220 and/or the computing device 101 may control any suitable notification device of the PAN 103 to provide an audio notification and/or heads-up, hands-free description and/or notification of the distinguishing activity of the target object 119 with any suitable audio description and/or heads-up, hands-free description and/or notification of the appearance of the target object 119 (e.g., as determined from the information 117). For example, the controller 220 and/or the computing device 101 may transmit a command to a device of the PAN 103, that includes an audio device, to provide an audio notification of the distinguishing activity with a respective audio description of the appearance of the target object 119.

In a particular example, the controller 220 and/or the computing device 101 may transmit a command to the mobile device 107 and/or the BWC 109 and/or the RSM 111 and/or the HUD 113 control a respective speaker thereof to provide an audio notification that "The target object is holding a pole and is wearing a ball-cap and shorts" and/or "The target object is holding a pole and facing left and is wearing a ball-cap and shorts". However, the respective audio description of the appearance of the target object 119 may include any suitable description of the appearance of the target object 119 (e.g., with respect to age, gender, race, height, build, etc., as described above).

In another particular example, the controller 220 and/or the computing device 101 may transmit a command to the HUD to the HUD 113 to provide a visual notification of the distinguishing activity and the appearance of the target object 119, for example a visual notification that includes text such as "The target object is holding a pole and is wearing a ball-cap and shorts" and/or "The target object is holding a pole and facing left and is wearing a ball-cap and shorts", and the like.

In any of the aforementioned examples, where the computing device 101 is integrated with a device of the PAN 103 and/or a device that includes a camera and a notification device, the computing device 101 may control the notification device via a local communication link and/or a local computer bus (e.g., similar to the common data and address bus 217), and the like.

Hence, in general, at the block 308, the controller 220 and/or the computing device 101 may control a notification device to provide the notification of the distinguishing activity by one or more of: controlling an audio device, located with the camera (e.g., the BWC 109 and/or a camera at which images were acquired), to provide an audio description of the distinguishing activity; and controlling a heads-up, hands-free notification device, located with the camera, to provide a heads-up, hands-free notification of the distinguishing activity. The term "audio device located with the camera" is understood to include audio devices and cameras, which the user 105 is operating and/or is wearing; as such the audio device, which is controlled, and the camera, may be located at different devices in the PAN 103 and/or at a same device, and the like.

Similarly, in some examples, at the block 308, the controller 220 and/or the computing device 101 may control a notification device to provide the notification of the distinguishing activity by one or more of: controlling an audio device, located with the camera (e.g., the BWC 109), to provide an audio description of the distinguishing activity and a respective audio description of the appearance of the target object 119; and controlling a heads-up, hands-free notification device, located with the camera, to provide a heads-up, hands-free notification of the distinguishing activity and a respective heads-up, hands-free notification of the appearance of the target object 119.

Regardless, the user 105 is generally provided with an audio description and/or heads-up, hands-free notification of the distinguishing activity of the target object 119 so that the user 105 may locate the target object 119 and, for example, take an action related to the target object 119. Such actions may include, but is not limited to, reporting the target object 119 as having been located, for example, by operating a device of the PAN 103, and the like, to communicate with the dispatch device 115, and the like. However, any suitable action is within the scope of the present specification.

In some examples, the method 300 may be implemented in real-time, for example as images from the BWC 109, and the like, are received at the computing device 101. Put another way, method 300 may further comprise the controller 220 and/or the computing device 101: receiving, in real-time, the images acquired by the camera (e.g., the BWC 109, and the like); furthermore, determining that the target object is located in the images, at the block 304, and determining the distinguishing activity of the target object 119, at the block 306, may occur as the images are received. In such examples, the controller 220 and/or the computing device 101 may control the notification device, at the block 308, in about real-time, as the images are received, such that the user 105 may locate the target object 119 in about real-time.

However, in other examples, the images may be received at the computing device 101 and stored at one or more memories, such as the memory 127, prior to the method 300 being implemented and/or at least prior to the information 117 being received and/or at least prior to the block 304, the block 306 and the block 308 being implemented. Put another way, the information 117 and/or the images acquired by the BWC 109, and the like, may be received at any suitable time, and the blocks 304, 306, 308 may be implemented at any suitable time after receipt of the information 117 and/or the images. However, in some examples, receipt of the information 117, at the block 302, may cause the remainder of the method 300 to be implemented using stored images and/or images received in real-time.

Hence, in some examples, the method 300 may further comprise the controller 220 and/or the computing device 101: accessing images acquired by a camera (e.g., such as the BWC 109, and the like) as previously stored at a memory (e.g., such as the memory 127); furthermore, determining that the target object 119 is located in the images (e.g., at the block 304) and determining the distinguishing activity of the target object 119 (e.g., at the block 306) occurs using the images as previously stored. In these examples, at the block 308, a notification device is controlled to provide a notification of the distinguishing activity at a time after the distinguishing activity occurred. For example, the notification may comprise an audio description (e.g., and/or a heads-up, hands-free notification) of the distinguishing activity (e.g., and optionally of the appearance of the target object 119) such as "The target object was recently holding a pole", and the like.

In some of these examples, the notification may include a time of the distinguishing activity (e.g., as determined using timestamps of the images as stored) and the notification may include an indication of the time. For example, the notification may comprise an audio description (e.g., and/or a heads-up, hands-free notification) of the distinguishing activity (e.g., and optionally of the appearance of the target object 119) such as "The target object was holding a pole 5 minutes ago", and the like.

Put another way, the method 300 may further comprise the controller 220 and/or the computing device 101: determining a time of the distinguishing activity in images as previously stored at a memory; furthermore, in these examples, controlling a notification device to provide a notification of the distinguishing activity (e.g., at the block 308) may comprise one or more of: controlling an audio device, located with the camera, to provide an audio description of the distinguishing activity and the time; and controlling a heads-up, hands-free notification device, located with the camera, to provide a heads-up, hands-free notification of the distinguishing activity. Such notifications may further comprise an audio description and/or a heads-up, hands-free notification of the appearance of the target object 119, as described above.

In yet further examples, the system 100 may include a further camera, for example operated by, and/or associated with, another user (e.g., another police officer), and/or such a further camera may comprise a wall-mounted and/or ceiling-mounted camera, and the like, for example operated by an public-safety entity and/or another suitable entity type (e.g., a public-transit entity operating a camera in a subway car, and the like, an entity operating a mall, and the like and/or any other suitable type of entity). Regardless, in these examples, the further camera may have a field-of-view that overlaps with a field-of-view of the camera associated with the user 105 at least at a time that the camera associated with the user 105 (e.g., the BWC 109) acquired an image of a target object in which a distinguishing activity was determined.

It is further understood, in these examples, that the controller 220 and/or the computing device 101 has access to respective images from the respective camera; for example, such respective images may be stored at the memory 127 and/or another memory to which the computing device 101 has access. In these examples, the controller 220 and/or the computing device 101 may determine a time of the distinguishing activity in the images (e.g., from the BWC 109, and the like), as described above. Furthermore, in these examples, the controller 220 and/or the computing device 101 may: identify, using the time and the distinguishing activity, the target object 119 in previously stored respective images from the further camera (e.g., having a respective field-of-view that overlaps with a field-of-view of the camera); and track the target object 119 in one or more of the previously stored respective images from the further camera and respective real-time images from the further camera.

Hence, for example, the controller 220 and/or the computing device 101 may identify the target object 119 at a time of the identified distinguishing activity in the stored respective images from the further camera and identify the target object 119 in previously acquired images from the further camera (e.g., to track the target object 119 "backward" through times of the previously acquired images).

Similarly, the controller 220 and/or the computing device 101 may identify the target object 119 at a time of the identified distinguishing activity in the stored respective images from the further camera and one or more of: identify the target object 119 in real-time images from the further camera (e.g., to track the target object 119 in the real-time images).

Put another way, when a time and distinguishing activity of the target object 119 is identified, the target object 119 may be identified in images from one or more further cameras acquired at, and/or around, the time using the distinguishing activity (and/or the information 117) and then identify the target object 119 in other images acquired by the one or more further cameras, backward or forward in time.

Figure 4:
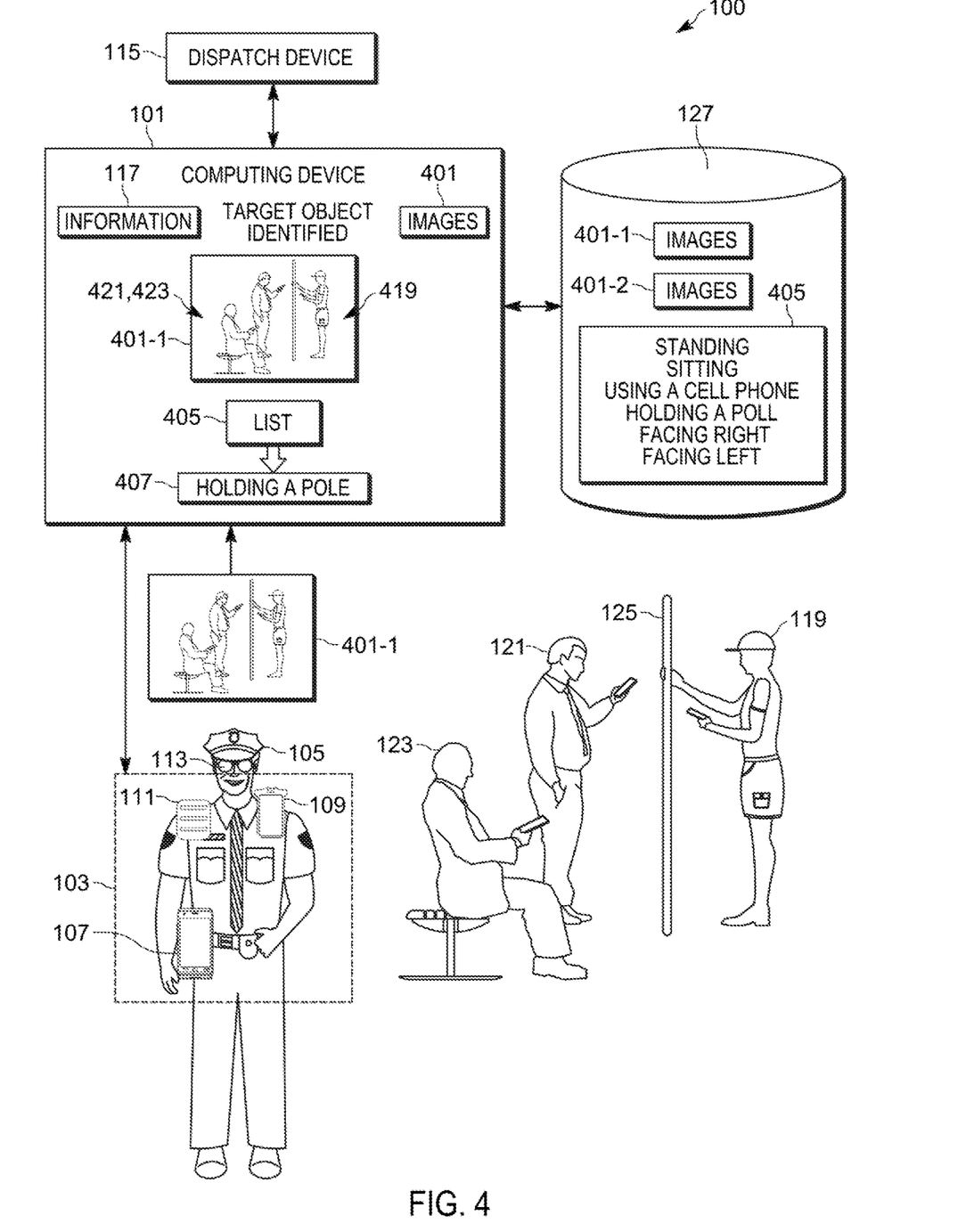
FIG. 4 depicts the system of FIG. 1 implementing a method for providing a notification of a distinguishing activity, in accordance with some examples.
Figure 5:
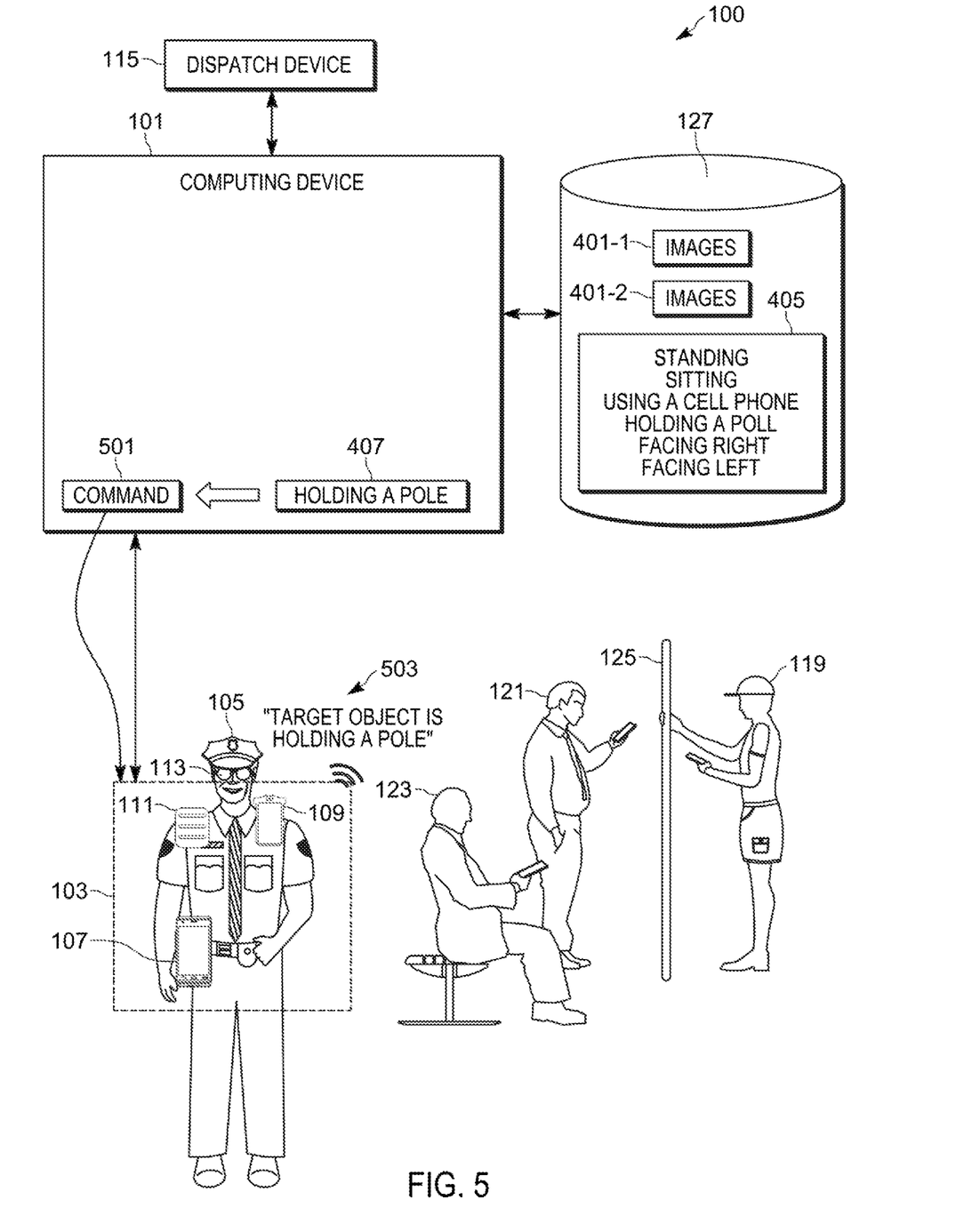
FIG. 5 depicts the system of FIG. 1 continuing to implement the method for providing a notification of a distinguishing activity, in accordance with some examples.
Figure 6:
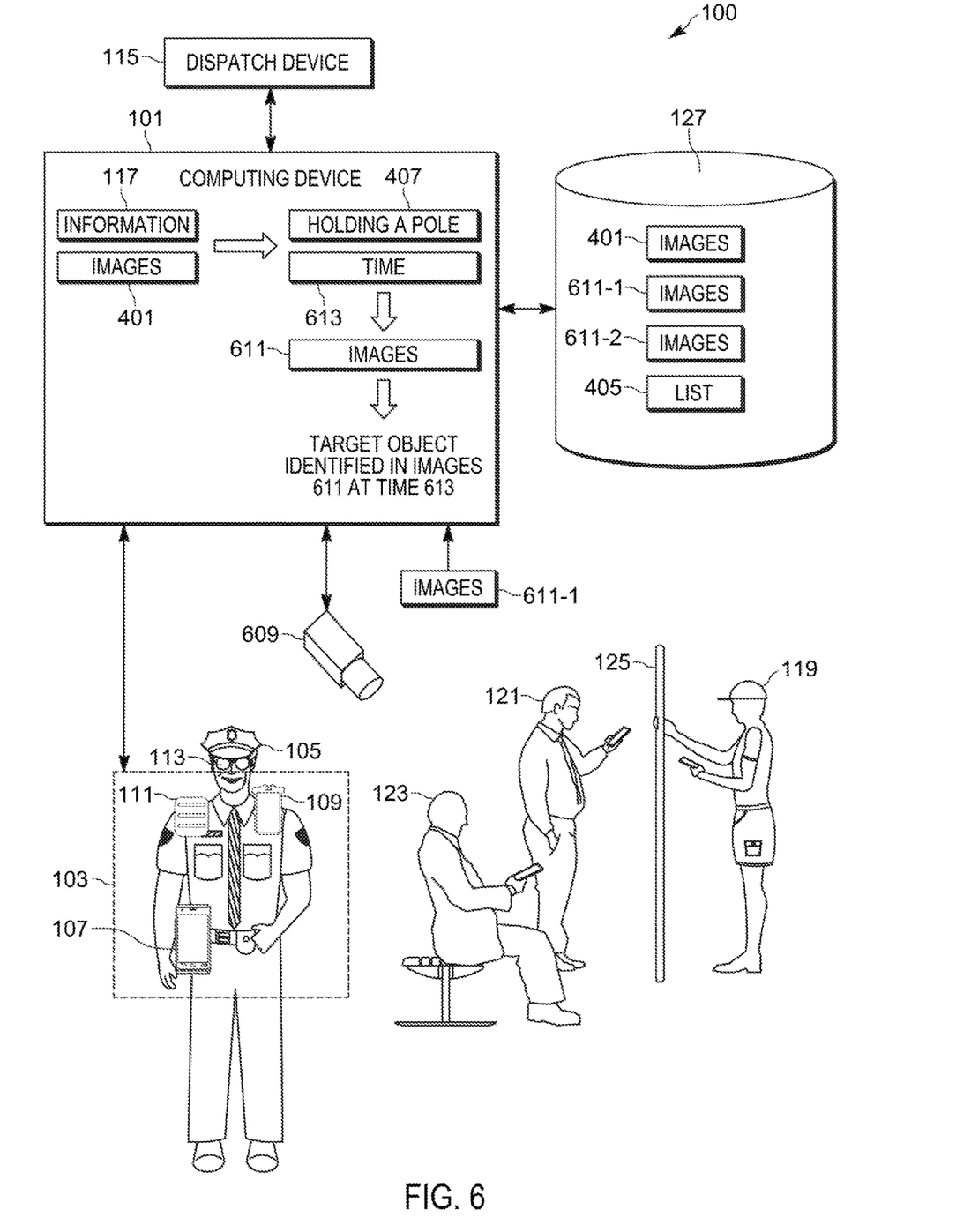
FIG. 6 depicts the system of FIG. 1 adapted to include two cameras, in which a target object is identified in images from one camera and identified in images from a further camera using a distinguishing activity of the target object, in accordance with some examples.

Attention is next directed to FIG. 4, FIG. 5, and FIG. 6, which depict examples of the method 300. FIG. 4, FIG. 5 and FIG. 6 are similar to FIG. 1, with like components having like numbers. It is understood in FIG. 4, FIG. 5 and FIG. 6 that the computing device 101 has received (e.g., at the block 302 of the method 300) the information 117, as described above with respect to FIG. 1.

Attention is next directed to FIG. 4, which depicts the computing device 101 receiving an image 401-1 (and/or images) from a camera of the PAN 103, such as the BWC 109. As depicted the image 401-1 include images of the objects 119, 121, 123 (as well as the pole 125) and are understood to be received in real-time. As depicted, the image 401-1 is stored at the memory 127 with previously received images 401-2 (e.g., which may or may not include one or more of the objects 119, 121, 123). The images 401-1, 401-2 are interchangeably referred to hereafter as the images 401, and/or as an image 401.

As depicted, the computing device 101 is processing and/or comparing the information 117 with the images 401 to determine whether the target object 119 is located in the images 401. As depicted, the computing device 101 determines (e.g., at the block 304 of the method 300) that the target object 119 is located in the image 401-1 (e.g., as represented by text "Target Object Identified", in FIG. 4).

For example, as depicted, the computing device 101 identifies a portion 419 of the image 401-1 as corresponding to the target object 119, and further identifies portions 421, 423 as corresponding to other objects 121, 123 of a type similar to the target object 119. While, as depicted, the computing device 101 determines that the target object 119 is located in the image 401-1 (e.g., received in real-time), in other examples, the computing device 101 may determine that the target object 119 is located in a previously received image 401-2; in these instances, the computing device 101 may further determine a time of a previously received image 401-2. However, the computing device 101 may also determine a time of the image 401-1. Furthermore, the computing device 101 may also determine an associated location at which the image 401-1 was acquired, as described above.

As depicted, the memory 127 has been further provisioned with a list 405 of activities that may be distinguishing activities of human target objects on a subway car, as described above. While only one list 405 is depicted, as also described above, the list 405 may be one list, of a plurality of lists of activities for different object types and/or for different locations. The list 405 may hence be selected on the basis of the target object 119 being a person and/or on the basis of location data received, as metadata with the images 401-1, indicating that the image 401-1 was acquired on a subway car and/or subway line, and the like.

As depicted, the activities of the list 405 include "Standing", "Sitting", "Using A Cell Phone", "Holding A Poll", "Facing Right", "Facing Left"; however such activities may include any suitable activities as described above.

As depicted, in FIG. 4, the computing device 101 determines (e.g., at the block 306 of the method 300) a distinguishing activity 407 of the target object 119; as depicted the distinguishing activity 407 comprises "Holding A Pole" as described above. While not depicted, the distinguishing activity 407 may further comprise "Facing Left", as also described above.

With reference to FIG. 5, the computing device 101 controls (e.g., at the block 308) a notification device of the PAN 103 to provide a notification of the distinguishing activity 407. For example, as depicted, the computing device 101 generates a command 501 and transmits and/or provides the command 501 to the PAN 103 where the command 501 is executed to control a notification device to provide a notification of the distinguishing activity 407. For example, as depicted, an audio device and/or speaker of the BWC 109 (and/or another audio device and/or speaker of another device of the PAN 103) is controlled via the command 501 to emit sound 503 that includes the phrase "Target Object is Holding A Pole". For example, the command 501 may include such a phrase as text, and a text-to-speech module at one or more device of the PAN 103 may convert the text to the sound 503.

Alternatively, a text-to-speech engine at the computing device 101 convert the text to an audio file, which is transmitted with the command 501, and the audio file may be played by a suitable notification device of the PAN 103.

In some of these examples, the sound 503 may be played at a sound level audible to the user 105, but which may not be audible to the objects 119, 121, 123 (e.g., in a whisper mode in which sound from audio devices of the PAN 103 is played at, or below, a given decibel level) to prevent the objects 119, 121, 123 from hearing the sound 503, and/or the sound 503 may be played at an in-ear speaker worn by the user 105, to prevent the objects 119, 121, 123 from hearing the sounds 503.

Alternatively, when the phrase is received as text in the command 501, the text may be rendered at the HUD 113. In examples where the command 501 controls the HUD 113, the command 501 may include the portion 419 of the image 401-1 that corresponds to the target object 119, and which may be rendered at the HUD 113.

Regardless, the user 105 is notified of the distinguishing activity of the target object 119 and may take an action thereafter associated with the target object 119 being located.

Attention is next directed to FIG. 6, which depicts the system 100, but adapted to include a further camera 609, for example a camera mounted in the subway car where the objects 119, 121, 123 are located. However, the camera 609 may alternatively be a camera worn and/or operated by another user, who may be similar to the user 105. As depicted the camera 609 is in communication with the computing device 101 and is acquiring images 611-1 of the objects 119, 121, 123 in real-time and transmitting the images 611-1 to the computing device 101. It is understood, in FIG. 6, that the field-of-view of the further camera 609 at least partially overlaps with the field-of-view of the camera, which acquires the images 401, at least at a time that the distinguishing activity 407 of the target object 119 occurs.

As depicted the computing device 101 stores the images 611-1 at the memory 127, for example, with previously received images 611-2 from the camera 609. The images 611-1, 611-2 are interchangeably referred to hereafter as the images 611 and/or an image 611.

In FIG. 6, the images 401 from a camera of the PAN 103 are also stored, as well as the list 405, as described above.

As also depicted in FIG. 6, the computing device 101 has determined the distinguishing activity 407 of the target object 119 using the images 401 and the information 117, as described above. As also depicted in FIG. 6, the computing device 101 has determined a time 613 of the distinguishing activity 407, as described above (e.g., from metadata of an image 401 in which the distinguishing activity 407 was determined).

As also depicted in FIG. 6, the computing device 101 identifies the target object 119 in the images 611 from the further camera 609 by identifying the target object 119 performing the distinguishing activity 407 in the images 611 at the time 613, for example as represented by "Target Object Identified In Images 611 At Time 613". Thereafter, the computing device 101 may process other images 611-1 received from the camera 609 to identify and track the target object 119 therein, for example to determine where the target object 119 may walk and/or move to; and/or the computing device 101 may process stored images 611-2 received from the camera 609 to identify and track the target object 119 therein to determine where the target object 119 has previously been.

Indeed, the process depicted in FIG. 6 may be repeated with other cameras (e.g., other subway cameras, cameras located in a subway station, cameras located on a street, etc.) in communication with the computing device 101 to continue to track movement of the target object 119. Put another way, once the target object 119 is identified in the images 401 at a time 613 using the distinguishing activity 407, the distinguishing activity 407 may be used to identify the target object 119 in images 611 from the other camera 609 to track previous and current movement of the target object 119. Furthermore, further distinguishing activities of the target object 119 may be determined in the images 611 at other times (e.g., as the target object 119 moves), which may be used to identify the target object 119 in images from other cameras (e.g., with a field-of-view that overlaps with the field-of-view of the camera 609) at the other times.

As should be apparent from this detailed description above, the operations and functions of the computing device are sufficiently complex as to require their implementation on a computer system, and cannot be performed, as a practical matter, in the human mind. Computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., among other features and functions set forth herein).

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any component(s) that may cause any benefit, advantage, or solution to occur or become more pronounced are not to be construed as a critical, required, or essential features or components of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of components does not include only those components but may include other components not expressly listed or inherent to such process, method, article, or apparatus. A component proceeded by "comprises . . . a", "has . . . a", "includes . . . a", "contains . . . a" does not, without more constraints, preclude the existence of additional identical components in the process, method, article, or apparatus that comprises, has, includes, contains the component. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method comprising:
   receiving, at a computing device, information describing an appearance of a target object;
   determining, at the computing device that the target object is located in images acquired by a camera by using the information to search the images via one or more of image analytics, video analytics and machine learning algorithms;
   determining, at the computing device, a distinguishing activity of the target object in the images using one or more of the image analytics, the video analytics and the machine learning algorithms; and
   controlling, by the computing device, a notification device to provide a notification of the distinguishing activity,
   wherein determining the distinguishing activity of the target object in the images comprises:
      determining that the target object is performing a given activity in a list of activities;
      when one or more other objects in the images are not performing the given activity, determining that the distinguishing activity comprises the given activity; and
      when at least one of the one or more other objects are performing the given activity: determining that the target object is performing a further activity of the list; and when the one or more other objects are not performing the further activity, determining that the distinguishing activity comprises the further activity.

2. The method of claim 1, further comprising, when there is no single activity performed by the target object that distinguishes from respective activities performed by one or more other objects in the images, determining the distinguishing activity of the target object in the images by:
   determining a combination of two or more activities of the target object that distinguish from respective combinations of the respective activities of the one or more other objects in the images.

3. The method of claim 1, wherein determining the distinguishing activity of the target object in the images comprises:
   determining one or more activities of the target object in the images;
   determining one or more respective activities of one or more other objects in the images; and
   determining that the distinguishing activity comprises one or more of the activities of the target object that distinguish from the one or more respective activities of the one or more other objects.

4. The method of claim 1, wherein controlling the notification device to provide the notification of the distinguishing activity comprises:
   controlling an audio device, located with the camera, to provide an audio description of the distinguishing activity.

5. The method of claim 1, wherein controlling the notification device to provide the notification of the distinguishing activity further comprises:
   controlling an audio device, located with the camera, to provide an audio description of the distinguishing activity and a respective audio description of the appearance of the target object.

6. The method of claim 1, further comprising:
   receiving, in real-time, the images acquired by the camera,
   wherein determining that the target object is located in the images and determining the distinguishing activity of the target object occurs as the images are received.

7. The method of claim 1, further comprising:
   accessing the images acquired by the camera as previously stored at a memory,
   wherein determining that the target object is located in the images and determining the distinguishing activity of the target object occurs using the images as previously stored.

8. The method of claim 1, further comprising:
   determining a time of the distinguishing activity in the images as previously stored at a memory,
   wherein controlling the notification device to provide the notification of the distinguishing activity comprises:
      controlling an audio device, located with the camera, to provide an audio description of the distinguishing activity and the time.

9. The method of claim 1, further comprising:
   determining a time of the distinguishing activity in the images;
   identifying, using the time and the distinguishing activity, the target object in previously stored respective images from a further camera having a respective field-of-view that overlaps with a field-of-view of the camera; and
   tracking the target object in one or more of the previously stored respective images from the further camera and respective real-time images from the further camera.

10. A device comprising:
    a controller in communication with a camera and a notification device, the controller configured to:
       receive information describing an appearance of a target object;
       determine that the target object is located in images acquired by the camera by using the information to search the images via one or more of image analytics, video analytics and machine learning algorithms;
       determine a distinguishing activity of the target object in the images using one or more of the image analytics, the video analytics and the machine learning algorithms; and
       control the notification device to provide a notification of the distinguishing activity, wherein the controller is further configured to determine the distinguishing activity of the target object in the images by:
    determining that the target object is performing a given activity in a list of activities;
    when one or more other objects in the images are not performing the given activity, determining that the distinguishing activity comprises the given activity; and
    when at least one of the one or more other objects are performing the given activity: determining that the target object is performing a further activity of the list; and when the one or more other objects are not performing the further activity, determining that the distinguishing activity comprises the further activity.

11. The device of claim 10, wherein the controller is further configured to: when there is no single activity performed by the target object that distinguishes from respective activities performed by one or more other objects in the images, determine the distinguishing activity of the target object in the images by:
    determining a combination of two or more activities of the target object that distinguish from respective combinations of the respective activities of the one or more other objects in the images.

12. The device of claim 10, wherein the controller is further configured to determine the distinguishing activity of the target object in the images by:
    determining one or more activities of the target object in the images;
    determining one or more respective activities of one or more other objects in the images; and
    determining that the distinguishing activity comprises one or more of the activities of the target object that distinguish from the one or more respective activities of the one or more other objects.

13. The device of claim 10, wherein the controller is further configured to control the notification device to provide the notification of the distinguishing activity by:
    controlling an audio device, located with the camera, to provide an audio description of the distinguishing activity.

14. The device of claim 10, wherein the controller is further configured to control the notification device to provide the notification of the distinguishing activity by:
    controlling an audio device, located with the camera, to provide an audio description of the distinguishing activity and a respective audio description of the appearance of the target object.

15. The device of claim 10, wherein the controller is further configured to:
    receive, in real-time, the images acquired by the camera; and
    determine that the target object is located in the images and determine the distinguishing activity of the target object as the images are received.

16. The device of claim 10, wherein the controller is further configured to:
    access the images acquired by the camera as previously stored at a memory accessible to the controller; and
    determine that the target object is located in the images and determine the distinguishing activity of the target object using the images as previously stored.

17. The device of claim 10, wherein the controller is further configured to:
    determine a time of the distinguishing activity in the images as previously stored at a memory accessible to the controller; and
    control the notification device to provide the notification of the distinguishing activity by: controlling an audio device, located with the camera, to provide an audio description of the distinguishing activity and the time.

18. The device of claim 10, wherein the controller is in communication with a further camera having a respective field-of-view that overlaps with a field-of-view of the camera, and the controller is further configured to:
    determine a time of the distinguishing activity in the images;
    identify, using the time and the distinguishing activity, the target object in previously stored respective images from the further camera; and
    track the target object in one or more of the previously stored respective images from the further camera and respective real-time images from the further camera.

* * * * *